United States Patent [19]

MacDonald

[11] 4,436,197
[45] Mar. 13, 1984

[54] ARTICLE ORIENTING APPARATUS

[75] Inventor: Murdo A. MacDonald, Bloomfield Hills, Mich.

[73] Assignee: Clyde Corporation, Auburn Heights, Mich.

[21] Appl. No.: 339,830

[22] Filed: Jan. 15, 1982

[51] Int. Cl.³ .............................................. B65G 47/24
[52] U.S. Cl. .................................... 198/389; 198/360
[58] Field of Search ........................ 198/389, 396–398, 198/360, 444, 954; 193/44, 46; 221/159–161, 164, 165, 172

[56] References Cited

U.S. PATENT DOCUMENTS

| | | | |
|---|---|---|---|
| 1,001,791 | 8/1911 | Wilcox | 198/398 |
| 3,044,660 | 7/1962 | Troll et al. | 193/44 |
| 3,346,095 | 10/1967 | Dixon | 198/397 |
| 3,572,492 | 3/1971 | Dreszig | 198/954 |
| 4,174,028 | 11/1979 | Barnes | 198/389 |

FOREIGN PATENT DOCUMENTS 52-47273  4/1977  Japan .................................. 198/389

*Primary Examiner*—Joseph E. Valenza
*Attorney, Agent, or Firm*—Barnes, Kisselle, Raisch, Choate, Whittemore & Hulbert

[57] ABSTRACT

An apparatus for orienting a plurality of articles with a head and a shank. An elevator dumps the articles onto a track having a pair of laterally spaced apart rails which slope downwardly so that articles can slide toward the lower end of the track. Some of the articles fall off the track, others assume a desired orientation with their heads bearing on the rails and their shanks depending therebetween, and the remainder begin to slide down the track in other orientations. A gate associated with the track permits only those articles in the desired orientation to continue sliding down the track and prevents all the articles in other orientations from going past the gate. To remove the misoriented articles, a discharge section of the track immediately upstream from the gate is moved intermittently so that the articles fall off this section of the track.

11 Claims, 8 Drawing Figures

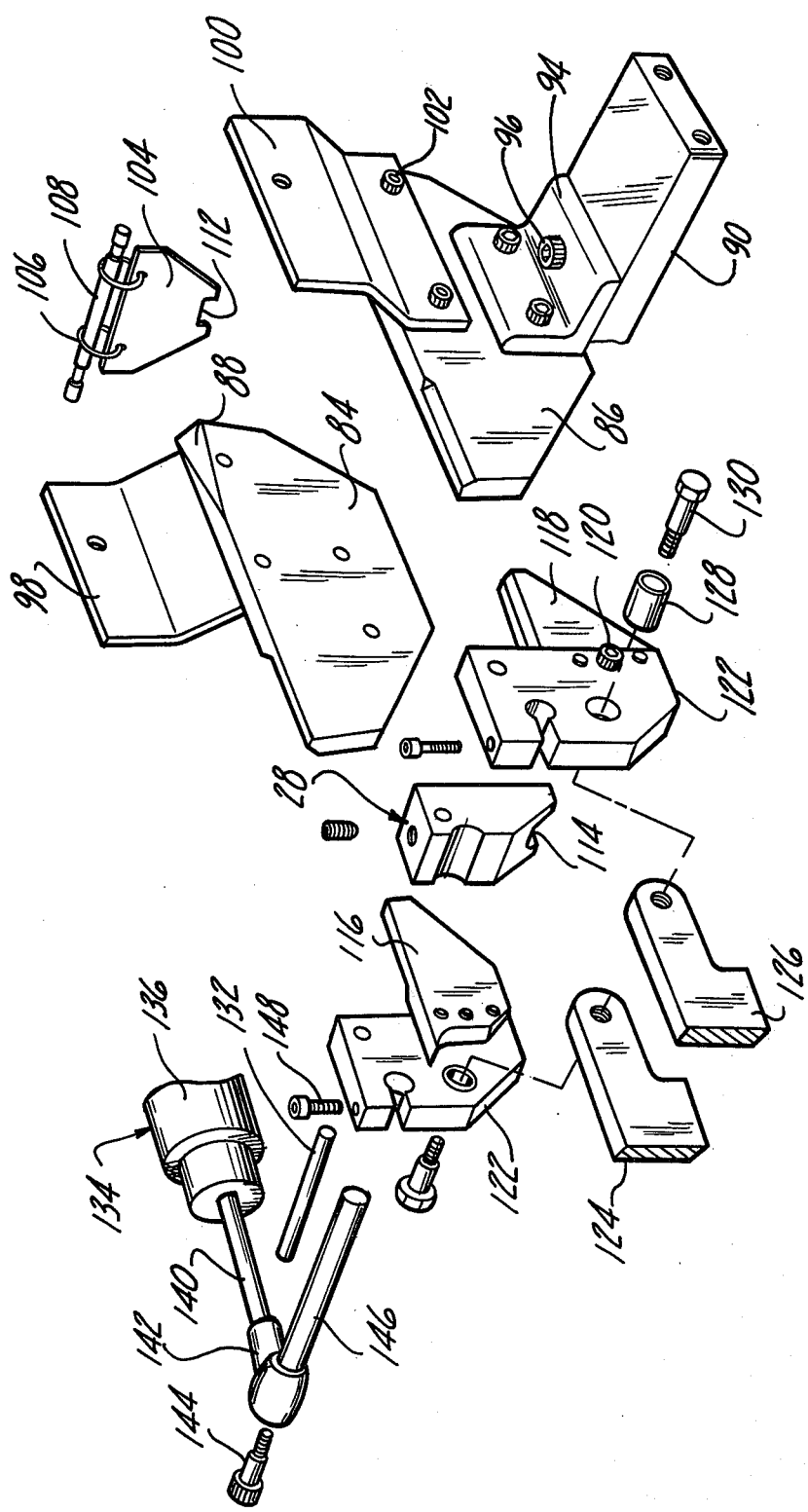

ARTICLE ORIENTING APPARATUS

BACKGROUND OF THE INVENTION

This invention relates to orienting and feeding apparatus and more particularly to an apparatus for orienting a plurality of like articles having a head and a shank such as screws.

In mass production and assembly line operations using a power tool such as a screw driver for automatically driving articles having a head and a shank such as bolts and screws, it is necessary to rapidly supply to the screw driver one article at a time in a predetermined orientation. Usually, although not necessarily, the articles are oriented in generally parallel side by side relationship with the heads of adjacent articles abutting each other and their shanks depending. Because they have so many edges, such articles are highly susceptible to becoming caught, hung up or misaligned in an orienting apparatus and hence, it is extremely difficult to rapidly and automatically orient such articles to provide an uninterrupted succession of articles with the same orientation.

Several complex devices having many parts have been previously devised for orienting such articles. These devices are expensive to manufacture, require frequent service and frequent replacement of moving parts, are difficult to maintain in satisfactory working order for high speed mass production and assembly operations, and are usually very noisy in operation.

BRIEF SUMMARY OF THE INVENTION

A plurality of articles such as screws or bolts are oriented in the same predetermined relationship which preferably is a succession of the articles disposed in generally parallel side by side relationship. The articles to be oriented are dumped a few at a time preferably by an elevator onto a track having a pair of spaced apart rails which slope downwardly so that articles can slide along the track toward its lower end. As the articles are dumped, some fall off the track, others assume a desired orientation on the track in which their heads bear on the rails and their shanks extend therebetween, and the remainder are received on the track in other orientations.

A gate located downstream from the point at which articles are dumped on the track permits only articles in the desired orientation to move along the track downstream of the gate and prevents articles in any other orientation (misoriented articles) from passing downstream of the gate. To remove misoriented articles from the track, a discharge section of the track immediately upstream of the gate is movable from a first position in alignment with adjacent portions of the track to a second position in which the articles drop from the discharge section. Preferably the articles which drop from the track are returned by a slide to a hopper which supplies articles to the elevator which raises and dumps the articles onto the track.

Preferably the discharge section is periodically moved in a cycle from the first position to the second position and back to the first position. Preferably this cycle is synchronized with and of short enough duration so that it occurs periodically at intervals between the sequential dumping of articles by the elvator onto the track.

Object features and advantages of this invention are to provide an article orienting apparatus which is of greatly simplified design, has far fewer parts, has very few moving parts, significantly decreases the likelihood of articles becoming hung up or jammed in the apparatus, orients articles at a significantly faster rate, is significantly less expensive to manufacture and assemble, is readily and easily adapted to orienting different size articles, requires significantly less maintenance and repair, is significantly quieter in operation, and has significantly improved durability, reliability and performance in mass production and assembly operations.

These and other objects, features and advantages of this invention will be apparent from a perusal of the following detailed description, appended claims, and accompanying drawings in which:

FIG. 8 is an exploded perspective view of several of the component parts of the apparatus of FIG. 1.

DETAILED DESCRIPTION OF THE PREFERRED EMBODIMENT

Figure 1:
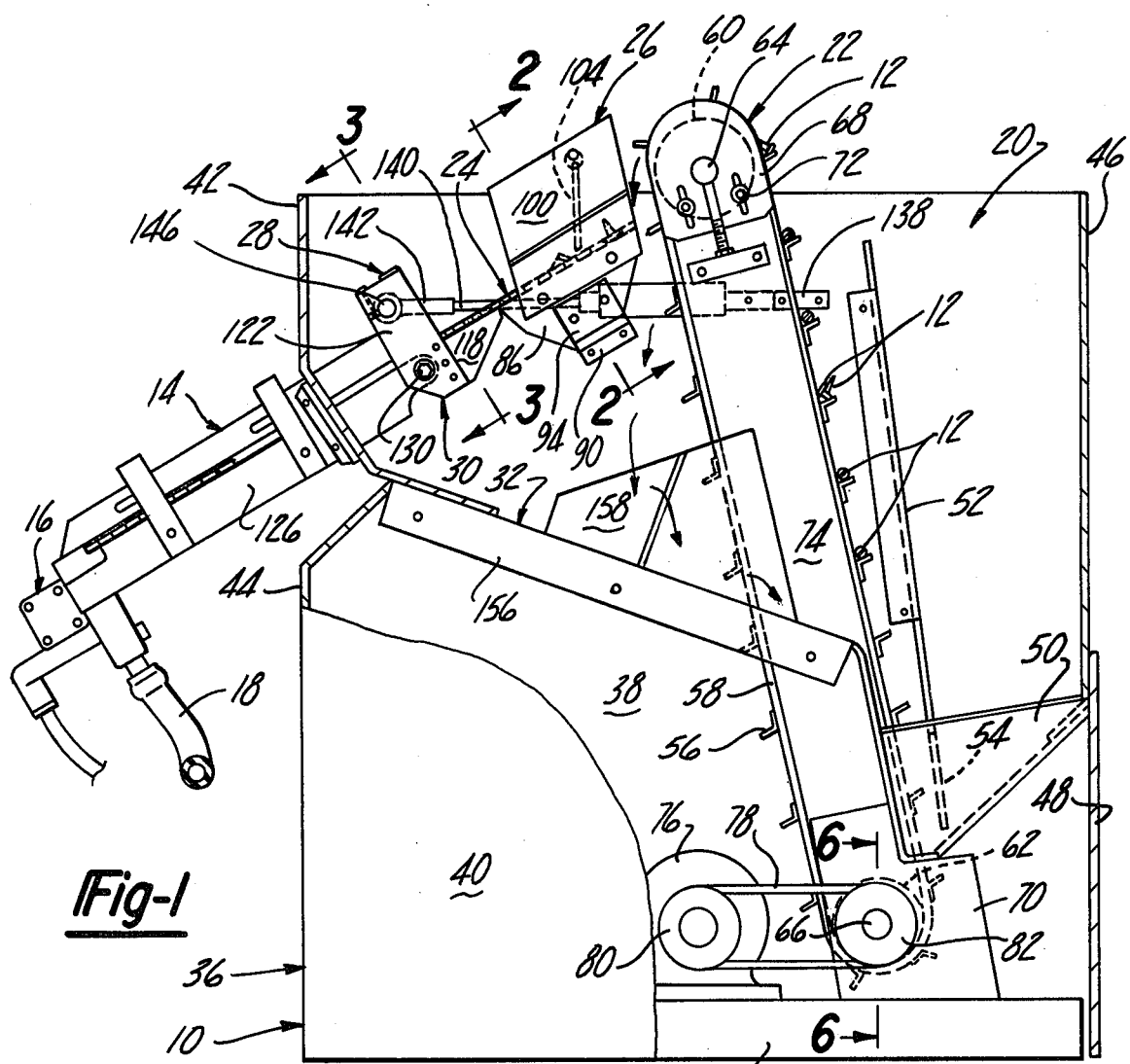
FIG. 1 is a side view with portions broken away of an article orienting apparatus embodying this invention associated with a device for feeding the oriented articles one at a time through a flexible hose to a power tool such as a power screw driver.

Referring in more detail of the drawings, FIG. 1 illustrates an article feed apparatus 10 embodying this invention which orients and supplies articles such as screws 12 to an accumulator 14 which supplies the screws to a pneumatic device 16 which feeds the screws one at a time through a flexible hose 18 to a power tool (not shown) such as a screw driver. The feed device 16 may be of conventional design but preferably is the feed device disclosed and claimed in U.S. Pat. application, Ser. No. 202,426, filed on Oct. 30, 1980, now U.S. Pat. No. 4,363,573 the disclosure of which is incorporated herein by reference.

The screws 12 to be oriented are initially received in a hopper 20 from which they are removed a few at a time by an elevator 22 and dumped onto the upper end of a track assembly 24 through a guide chute 26. Only properly oriented screws are permitted to slide down the track to the accumulator 14 by a gate 28 and improperly oriented screws are dumped from the track by a discharge track assembly 30. Fasteners which drop from the track are returned to the hopper by a slide assembly 32.

Apparatus 10 has a base 34 and a generally rectangular housing 36 with side wall panels 38 and 40 and end wall panels 42, 44, 46 and 48 all fabricated from sheet metal. Screws to be oriented by the apparatus are received in the hopper 20 defined by the cooperation of portions of the housing 36 and a funnel shaped bottom member 50 and a baffle 52 secured to the housing. The screws to be oriented pass through an opening 54 in the lower end of the baffle.

The elevator assembly 22 has a plurality of buckets 56 secured in equally longitudinally spaced apart relationship to an endless belt 58 received over idler and drive rolls 60 and 62. The rolls 60 and 62 are secured to shafts 64 and 66 journaled by bearings in carrier plates 68 and mounting blocks 70 respectively. The carrier plates 68 are adjustably secured by cap screws 72 to one end of side plates 74 which are secured at their other ends to the mounting blocks 70 which are fixed to the base 34. The elevator 22 is driven by an electric motor 76 mounted on the base 34 and connected to the roll 62 by a timing belt 78 and pulleys 80 and 82.

Figure 2:
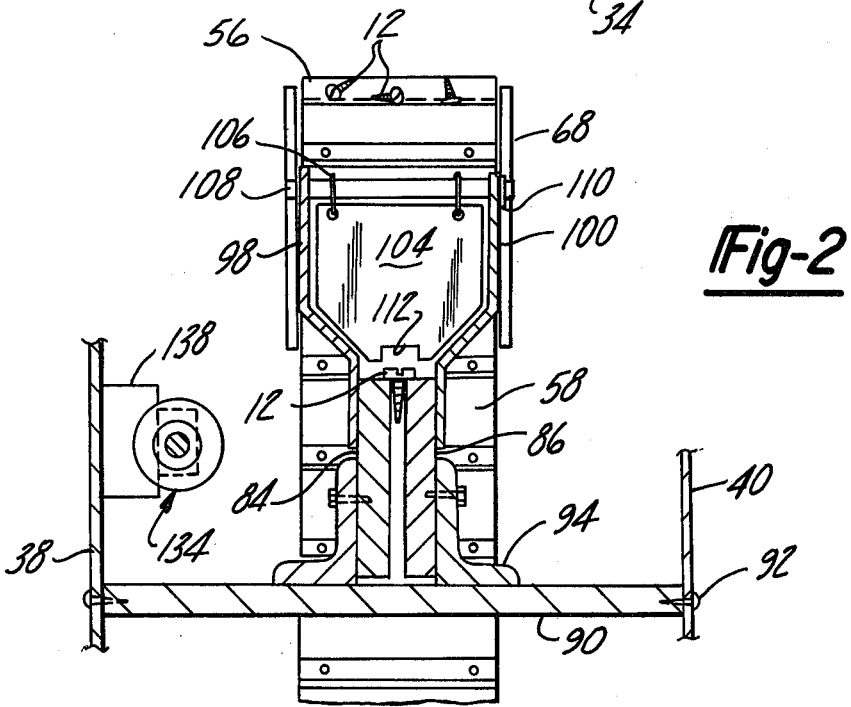
FIG. 2 is a fragmentary sectional view on line 2—2 of FIG. 1.

In accordance with this invention, when the screws 12 are dumped by the elevator 22 onto the upper end of the track assembly 24 some of the screws assume the desired orientation. As shown in FIG. 1 and 2 the track assembly has a pair of opposed parallel and laterally spaced apart rails 84 and 86 on which screws can be received in the desired orientation with their heads bearing on the upper edges of the rails and their shanks depending therebetween. To facilitate orientation of the screws, the leading edge of each rail 84 and 86 has an inclined or beveled face 88 (FIG. 8). The rails are mounted in parallel and laterally spaced apart relationship by a support plate 90 secured by cap screws 92 to the side panels 38 and 40 of the housing 36 and angle iron brackets 94 secured to the rails and the support plate by cap screws 96.

The screws 12 are directed onto the upper end of the track assembly 24 by a pair of guide plates 98 and 100 secured to the rails 84 and 86 by cap screws 102. Positioning of the screws in the desired orientation on the track is also facilitated by a movable flap 104 which is pivotally mounted by a pair of rings 106 received on a pin 108 extending through the guide plates 98 and 100 and retained thereon by snap rings 110. To facilitate the passing of properly oriented screws under the flap 104, a slot 112 is provided in its bottom.

Figure 3:
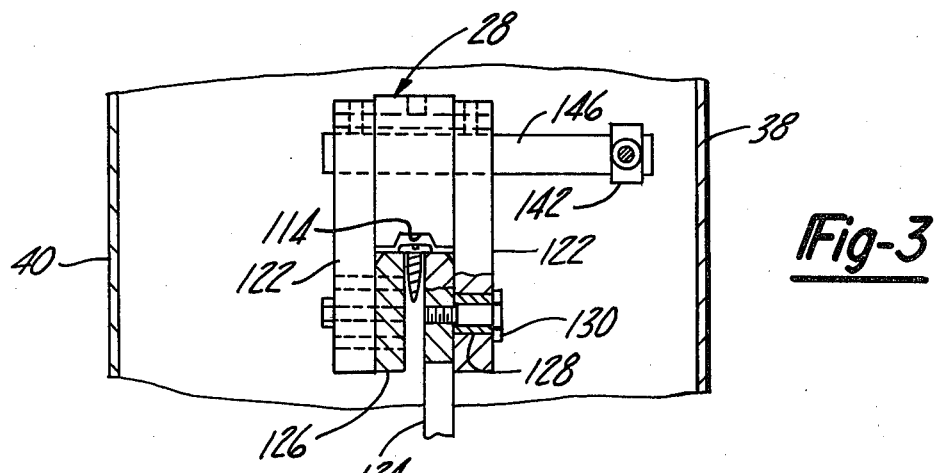
FIG. 3 is a fragmentary sectional view on line 3—3 of FIG. 1.
Figure 5:
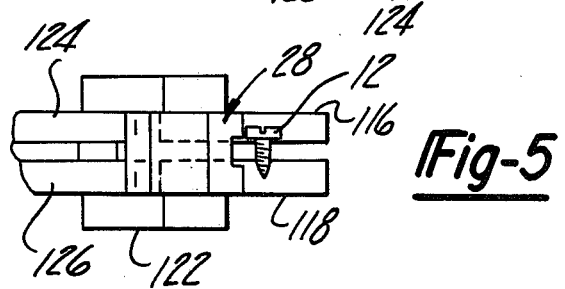
FIG. 5 is a fragmentary top view on line 5—5 of FIG. 4 of a gate and a discharge section of the track of the apparatus of FIG. 1.

Most of the improperly oriented screws drop off of the track 24 when they pass downstream of the guide plates 98 and 100. However, some of the improperly oriented screws continue to move down the track along with the properly oriented screws. To prevent the improperly oriented screws from passing into the accumulator 14 while permitting at least some properly oriented screws to do so the gate 28 is associated with the track downstream of the guide plates. As shown in FIG. 3, a slot 114 is provided in the bottom of the gate 28 to permit only properly oriented screws to pass therethrough.

Figure 4:
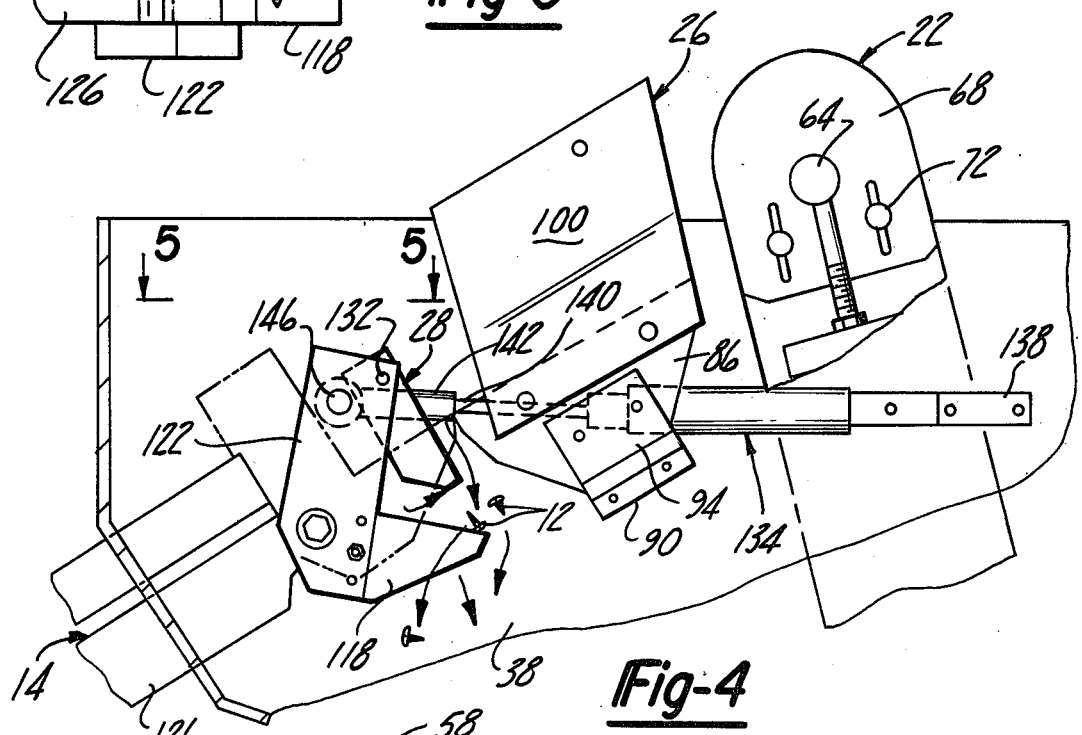
FIG. 4 is an enlarged fragmentary side view of the apparatus of FIG. 1.

Improperly oriented screws are removed from in front of the gate and the associated track by the discharge track assembly 30. As shown in FIGS. 2-4 the discharge track assembly 30 has a pair of laterally spaced apart rail sections 116 and 118 secured by cap screws 120 to bearing blocks 122 pivotally mounted on the upstream end of rails 124 and 126 of the accumulator 14 by bushings 128 and shoulder screws 130 (FIG. 8).

To dump screws 12 from the track assembly 24, the discharge assembly 30 is moved from the raised position shown in FIG. 1 to the lowered position shown in FIG. 4 wherein the movable rail sections 116 and 118 are inclined downwardly so that all the screws drop from the rails. To facilitate removal of all of the screws from the discharge rail assembly, the gate 28 is preferably, although not necessarily, pivotally mounted by a pin 132 between the bearing blocks 122 so that the lower end of the gate swings toward the free end of the rail sections 116 and 118 to knock the screws off the movable rail sections.

The discharge rail assembly 30 is moved to the raised and lowered positions by a pneumatic cylinder 134. The casing 136 of the cylinder 134 is pivotally mounted on a block 138 secured to the side panel 38 and the piston rod 140 of the cylinder is pivotally connected to the discharge track assembly 30 by a coupling 142, shoulder screw 144 and a pin 146 secured to the bearing blocks 122 by cap screws 148. A positive stop limiting the pivotal movement of the gate 28 when the discharge track assembly is raised is also provided by the pin 146.

Figure 6:
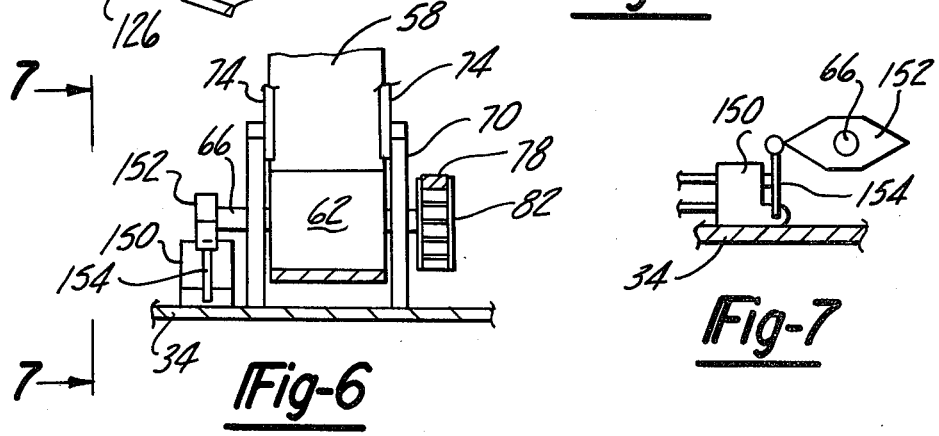
FIG. 6 is a fragmentary side view taken generally on line 6—6 of FIG. 1 of a pneumatic valve and actuating cam of the apparatus.
Figure 7:
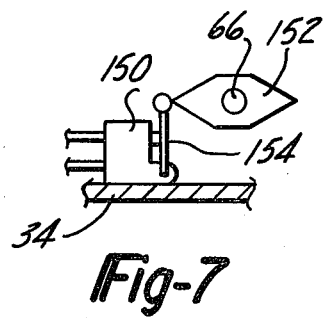
FIG. 7 is a fragmentary end view taken generally on line 7—7 of FIG. 1.

The discharge assembly 30 is periodically driven by cylinder 134 in a complete cycle in which it goes from the raised to the lowered position to dump screws therefrom and then is immediately returned to the raised position. This cycle is controlled by a pneumatic valve 150 (FIGS. 6 and 7) mounted on the base 34 and connected by appropriate conduits (not shown) to the cylinder; and a cam 152 mounted on the shaft 66 of the drive roll of the elevator 22. The valve 150 normally maintains the cylinder 134 in the extended position shown in FIG. 1 so that the discharge assembly 30 is raised, and when its actuator arm 154 is depressed by engagement with one of the lobes of cam 152 the piston rod of the cylinder 134 is retracted to move the discharge assembly to the lowered position shown in FIG. 4.

Preferably, but not necessarily, each cycle of the discharge assembly 30 is synchronized with the movement of the elevator 22 so that it occurs when no screws are being dumped onto the track 24. In other words, this cycle occurs in the interval between the dumping of the screws 12 onto the track 24 by adjacent scoops 56 of the elevator. This is achieved by designing cam 152 with the appropriate number of lobes and angular spacing between the lobes in relation to the interval between the discharge of screws by adjacent scoops 56 of the elevator so that each cycle is initiated and completed in the appropriate timed relationship to the dumping of screws onto the track by the elevator.

When the screws 12 drop from the track 24 they are returned to the hopper 20 by a slide pan 156 secured to the panels 38 and 40 of the housing 36. The screws are prevented from dropping through a hole in the pan 156 which provides clearance for the elevator by a cover 158 secured to the pan.

Apparatus 10 is usually installed for use by attaching a feed device 16 to the lower end of accumulator 14 as shown in FIG. 1. The feed device 16 and pneumatic valve 150 are both connected to a suitable source of compressed air and motor 76 is connected to a suitable source of electric power.

In using apparatus 10 a quantity of articles 12 is placed in hopper 20 and motor 76 is energized to drive the elevator 22. The buckets 56 of the elevator 22 lift the articles 12 from the hopper a few at a time and dump them into the guide chute 26 on the upper end of the track assembly 24. The articles 12 are directed onto the track by the guide 26 and the flap 104. Some of these articles fall off the track and are returned to the hopper by the slide 32, others become properly oriented on the spaced rails 84 and 86 of the track, and the remainder become misoriented on the track. As they slide down the track at least some of the properly oriented articles pass under the gate 28 and the leading improperly oriented article is restrained by the gate.

This prevents the leading improperly oriented article and all other upstream articles from passing under the gate. Periodically these articles are removed from the track by moving the discharge section 30 of the track to the lowered position shown in FIG. 4 which dumps the articles on this section of the track. The discharge section 30 is periodically lowered and then returned to its raised position by pneumatic cylinder 134 which is actuated and controlled by valve 150. To move the discharge section 30 to the raised position valve 150 directs compressed air into one end of the cylinder 134 to extend its piston rod 140. To move the discharge section to the lowered position valve 150 directs compressed air into the other end of the cylinder 134 to retract its piston rod 140.

The discharge section 30 is periodically cycled by movement of the actuator arm 154 of the valve 150 by the cam 152. The cam 152 is driven by the motor 76 in timed relationship with the elevator 22 so that the discharge section is cycled in the interval between dumping of the articles 12 onto the track by the elevator.

The articles dumped from the track are returned to the hopper 20 by the slide 32. The properly oriented articles which pass under the gate 28 are received in the accumulator 14 in generally side by side parallel relationship. Apparatus 10 properly orients articles 12 at a faster rate than they are supplied one at a time to the feed device 16. Hence the apparatus 10 provides an uninterrupted supply of only properly oriented articles to the feed device 16.

I claim:

1. An apparatus for orienting articles each having a head and a reduced shank comprising, a track having a pair of generally parallel and laterally spaced apart rails constructed and arranged to receive the head of an article thereon with at least a portion of the shank thereof depending therebetween, said track sloping downwardly such that articles received thereon will slide toward the lower end thereof, a discharge section of said track being constructed and arranged to be movable to a first position in generally longitudinal alignment with said track such that articles received thereon will slide toward the lower end of said discharge section and to a second position wherein at least a portion of said discharge section is displaced from said first position such that articles will drop off said discharge section, a gate associated with said track and constructed and arranged to permit only articles received on said track with their heads bearing on said rails and their shanks depending therebetween to move on said track downstream of the lower end of said discharge section and to prevent articles bearing on said track in any other orientation from moving downstream of the lower end of said discharge section, article delivery means associated with said track and constructed and arranged to repeatedly dump articles onto said track upstream of said gate, drive means constructed and arranged to move said discharge section of said track to said first and second positions, and cycle means associated with said drive means and constructed and arranged to periodically cycle said drive means to move said discharge section of said track from said first position to said second position and back to said first position, whereby at least some of the articles dumped onto said track by said article delivery means are received on said track with their heads bearing on said rails and their shanks depending therebetween and at least some of such articles so received on said track and not so oriented are prevented by said gate from passing downstream thereof and the periodic cycling of said discharge section of said track removes therefrom any not so oriented articles bearing on said discharge section such that a succession of only oriented articles emerge from said track downstream of said gate.

2. The apparatus of claim 1 wherein said gate is carried by said discharge section of said track for movement therewith.

3. The apparatus of claim 1 wherein said gate is carried by said discharge section of said track for movement therewith and is mounted for pivotal movement with respect to said discharge section of said track when it is moved between said first and second positions thereof.

4. The apparatus of claim 1 which also comprises synchronization means constructed and arranged to synchronize the cycling of said discharge section of said track in relation to the dumping of articles onto said track by said article means.

5. The apparatus of claim 1 which also comprises a guide upstream of said gate and constructed and arranged to direct articles discharged from said article delivery means onto said track upstream of said gate.

6. The apparatus of claim 1 which also comprises a guide having a pair of laterally spaced apart side walls located adjacent said track and constructed and arranged to direct articles discharged from said article delivery means onto said track upstream of said gate, and a flap disposed between said side walls and constructed and arranged to retard the movement of articles downstream through said guide which are not received on said track with their heads bearing on said rail and at least a portion of their shanks depending therebetween.

7. The apparatus of claim 6 wherein said flap is carried by said side walls for pivotal movement with respect to said side walls.

8. The apparatus of claim 1 wherein said article delivery means comprises an elevator constructed and arranged to dump periodically a plurality of articles onto said track upstream of said gate.

9. The apparatus of claim 1 which also comprises a hopper constructed and arranged to receive a plurality of articles, and wherein said article delivery means comprises an elevator disposed at least in part in said hopper and constructed and arranged to dump periodically articles onto said track upstream of said gate.

10. The apparatus of claim 1 which also comprises a hopper constructed and arranged to receive a plurality of articles to be oriented, said delivery means comprises an elevator disposed at least in part in said hopper having a plurality of spaced apart scoops constructed and arranged to receive articles and periodically dump them onto said track upstream of said gate, and synchronization means constructed and arranged to cycle said drive means when said elevator is operating such that said discharge section of track is in its first position when articles are dropped onto said track by said elevator and said discharge section of track is moved to said second position and returned to said first position during the interval between at least some of the successive dumpings of articles onto said track by said elevator.

11. The apparatus of claim 10 which also comprises a return slide communicating with said hopper, underlying said discharge section of said track, and constructed and arranged to receive articles which fall off said track upstream of said gate and return them to said hopper.

* * * * *